June 12, 1951 A. L. HAYNES ET AL 2,556,758

DIFFERENTIAL HYDRAULIC POWER TRANSMISSION

Filed Aug. 2, 1946 2 Sheets-Sheet 1

A. L. HAYNES.
V. G. RAVIOLO.
INVENTORS.

BY C.C. McRae
R.G. Harris
J.R. Faulkner
T.H. Oster

ATTORNEYS.

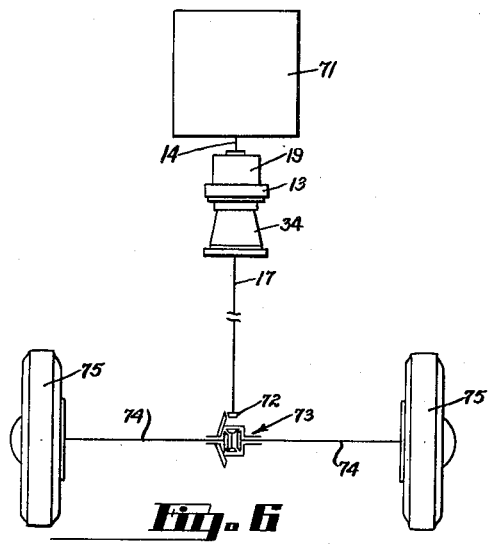
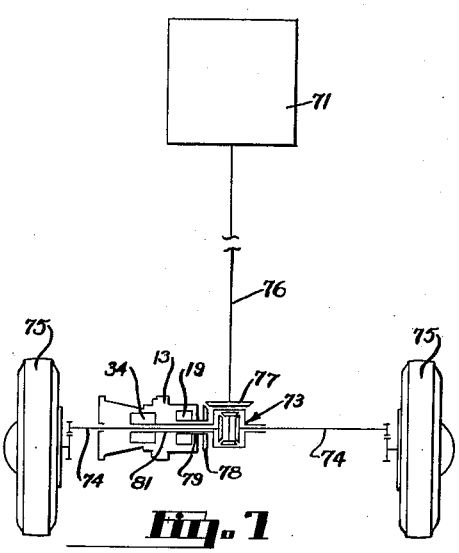
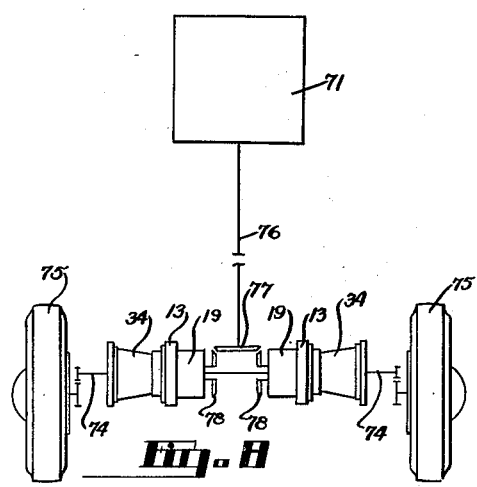
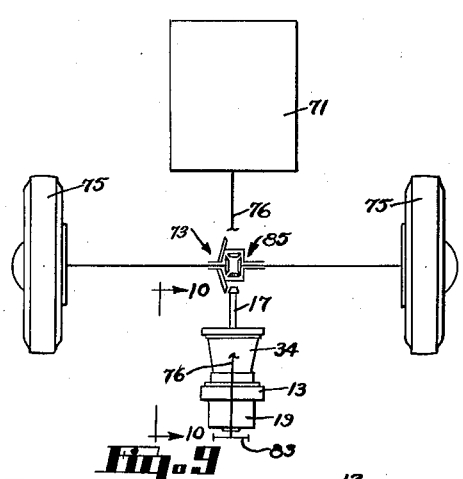
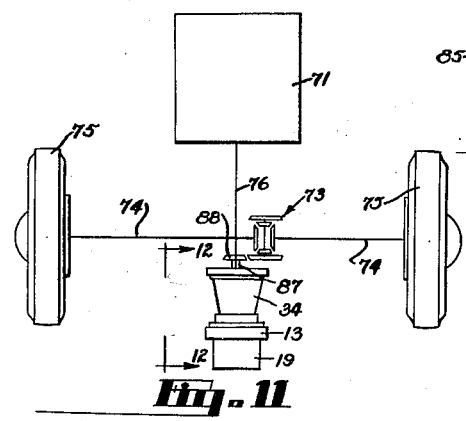
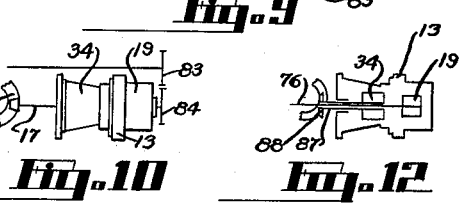

Patented June 12, 1951

2,556,758

UNITED STATES PATENT OFFICE 2,556,758

DIFFERENTIAL HYDRAULIC POWER TRANSMISSION

Alex L. Haynes, Detroit, and Victor G. Raviolo, Armada, Mich., assignors to Ford Motor Company, Dearborn, Mich., a corporation of Delaware Application August 2, 1946, Serial No. 688,018

4 Claims. (Cl. 60—53)

1

This invention relates generally to differential transmissions, and has particular reference to differential transmissions of the hydraulic type.

In a differential transmission the engine torque is divided, part being transmitted mechanically and the remainder transmitted though a secondary path, usually hydraulic or electric. Various types of such transmissions have heretofore been proposed in which the secondary path is hydraulic and takes the form of a pump and a hydraulic motor, the latter being provided with means for varying the displacement in a continuous manner so that a continuously variable torque ratio is available. An advantage of this type of transmission is that the overall efficiency is higher than that of the purely hydrostatic transmission since only a portion of the total power is transmitted hydraulically. One of the principal disadvantages of transmissions of this type has heretofore been the complicated and intricate valving and porting arrangement necessary to interconnect the pump and the variable displacement motor and to secure the proper operation of the latter. This is further complicated by the fact that, in transmissions of this type, both the housing of the pump and the housing or cylinder barrel of the variable displacement motor are rotated during operation of the transmission.

It is therefore an object of the present invention to provide a differential transmission of the hydraulic type in which relatively simple porting and interconnecting means are provided between the pump and the variable displacement motor. The simplicity of the construction results in greater efficiency due to a reduction in the turbulence of the fluid flow, and in addition reduces the initial cost of the mechanism and minimizes maintenance problems and expenses.

Another object of the invention is to provide a differential transmission of the hydraulic type which forms a compact unit and readily lends itself to various installations in the power train of an automotive vehicle. The transmission has a minimum of working parts, is inexpensive to manufacture, is entirely automatic and requires a minimum of controls, and provides a continuously variable torque ratio with a satisfactorily high efficiency.

Other objects include the provision of a dynamically balanced pump, bypass means for preventing creep at idling speeds, and other features which will be made more apparent as this description proceeds, particularly when considered

2 in connection with the accompanying drawings, in which:

Figure 1 is a longitudinal cross sectional view through the transmission.

Figures 2, 3 and 4 are transverse cross sectional views taken substantially on the planes indicated by the lines 2—2, 3—3 and 4—4 respectively of Figure 1.

Figures 6, 7, 8, 9 and 11 are diagrammatic fragmentary plan views of various installations of the transmission in a motor vehicle.

Figure 1:
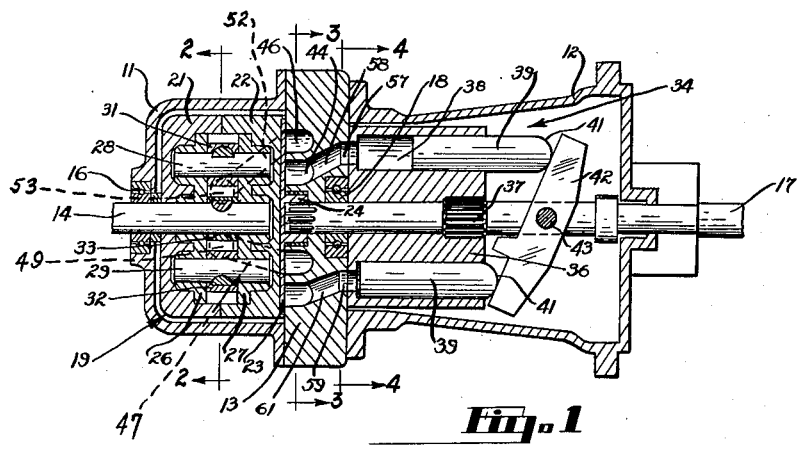

Figures 10 and 12 are diagrammatic side-elevational views of portions of Figures 9 and 11 respectively, when viewed in the direction of the arrows 10—10 and 12—12 of Figures 9 and 11 respectively.

Referring now to the drawings, it will be noted that the transmission of the present invention is contained within a stationary housing comprising the housing sections 11 and 12 positioned on opposite sides of the intermediate porting plate 13 and suitably secured thereto, as for example, by bolts. An input shaft 14 is journaled in bearings 16 in the housing section 11 and is adapted to be driven from a suitable power source. The output or load shaft 17 is journaled in the housing section 12 and in bearings 18 carried in the stationary porting plate 13.

Figure 2:
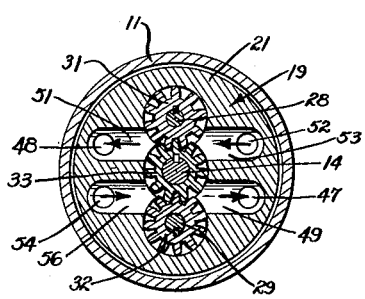

Referring particularly to Figures 1 and 2, the construction of the hydraulic pump 19 will be described. The pump shown is a gear pump of the constant displacement type, although other types of hydraulic pumps may be used as well and in some instances it may be desirable to utilize a variable displacement pump. The pump is housed within a rotatable housing consisting of housing sections 21 and 22 which may be formed of cast iron or preferably of aluminum or some other light weight alloy. The pump housing sections are secured to each other and the housing section 22 is secured to a steel wear plate 23. The hub 24 of the wear plate 23 is splined to the end of the output shaft 17. It will thus be seen that the pump housing rotates with the output shaft 17.

Mounted within the pump housing sections 21 and 22 are pump side plates 26 and 27 respectively which define between them the pump chamber and within which are journaled the shafts 28 and 29 carrying the driven gears 31 and 32 of the pump. The driven gears 31 and 32 each mesh with the driving gear 33, the latter being keyed to the input shaft 14. From the foregoing it will be apparent that the gears 31 and 33, and the gears 32 and 33, respectively, each form in effect a separate gear pump. Although a single gear pump comprising but a pair of gears can be utilized if desired, it is preferable to provide a triple gear or double pump unit, since the latter is symmetrical about the axis of the input shaft and is thus dynamically balanced, eliminating vibration.

The variable displacement motor 34, illustrated in Figure 1, is shown of the axial piston type, although other types of variable displacement motors may also be used with the present invention. The cylinder barrel 36 of the motor is splined to the output shaft 17 at 37 and is provided with a series of circumferentially spaced axially extending cylinders 38 within which are reciprocably mounted pistons 39.

The rearward ends of the pistons 39 are formed with arcuate bearing surfaces 41 which are engageable with the face of the swash plate 42. The swash plate 42 is mounted for angular movement about trunnions 43 journaled in the housing 12. The swash plate 42 may be adjusted angularly by suitable manually operated controls (not shown), or preferably may be connected to suitable automatic speed and torque responsive controls, such as those disclosed in the co-pending application of Alex L. Haynes, Serial No. 670,641.

The stationary porting plate 13, between the transmission housing sections 11 and 12, is provided with a pair of concentric annular grooves 44 and 46 which form respectively pressure and return manifolds. The pressure groove 44 is in communication with a pair of passages 47 and 48 through the wear plate 23 and the pump housing section 22 which in turn communicate with the outlet sides of the two gear pumps through the laterally extending passages 49 and 51 respectively. In like fashion, the return groove 46 communicates with the inlet sides of the two gear pumps through the passages 52, 53, and 54, 56.

Figure 4:
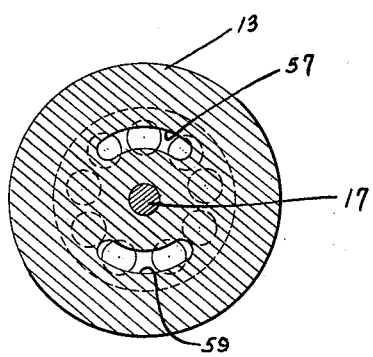

Referring now to Figures 1 and 4, it will be seen that the pressure groove 44 also communicates with an elongated arcuate port 57 in the opposite face of the porting plate 13 through a passage 58 formed in the plate. Similarly, the return groove 46 communicates with an elongated arcuate port 59 through an interconnecting passage 61. It will be noted from Figure 4 that the arcuate ports 57 and 59 are symmetrically arranged on opposite sides of the output shaft 17, and are suitably arranged for registration with the open ends of the cylinders 38 formed in the cylinder barrel 36.

Figure 3:
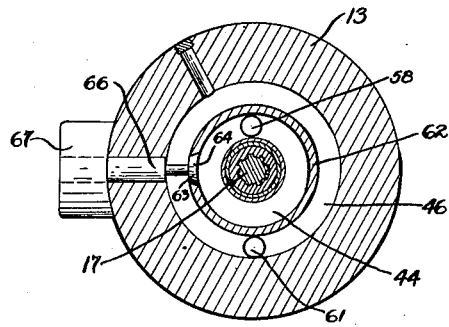

Creep at idling speeds, which would otherwise result since the angularity of the swash plate 42 would permit some transmission of power through the variable displacement motor, is eliminated by the bypass valve arrangement shown in Figure 3. The annular wall between the pressure groove 44 and the return groove 46 in the stationary porting plate 13 is provided with a conical passage 63 which forms a seat for the head 64 of the bypass valve 66. A solenoid 67 is mounted upon the exterior of the porting plate 13, and is arranged upon energization to urge the valve 66 to the right as shown in Figure 3, lifting the head 64 of the valve from the seat 63 and providing communication between the pressure groove 44 and the return groove 46. This short-circuits the fluid circuit and prevents power from being delivered to the motor 34. Creep at idling is thus wholly eliminated.

Operation

Inasmuch as the driving gear 33 of the constant displacement pump is driven by the input shaft 14 and the driven gears 31 and 32 are carried by the pump housing which is directly connected to the output shaft 17, it will be seen that the effective speed of the pump is the speed of the input shaft minus the speed of the output shaft. Fluid from the triple gear pump flows in the direction of the arrows shown in Figure 2 through the passages 51 and 48, and through the passages 49 and 47, to the annular pressure groove 44 in the stationary pressure plate 13. Although the pump housing containing the aforementioned passages is rotating relative to the pressure plate 13, leakage is prevented since the wear plate 23 carried by the pump housing provides a close fitting sliding engagement between the pump housing and the porting plate. From the pressure groove 44 the fluid pressure is directed through the passage 58 in the porting plate to the elongated arcuate pressure port 57 formed in the opposite face of the porting plate in alignment with the circumferential series of cylinders 38 in the cylinder barrel 36 of the variable displacement motor. As the rotating cylinder barrel 36 passes the arcuate pressure port 57, the cylinders are pressurized in succession, resulting in rotation of the cylinder barrel due to engagement of the pistons 39 with the inclined swash plate 42.

During the return stroke of the pistons 39, the exhaust fluid flows from the cylinder 38 to the arcuate return port 59 and thence through passage 61 to the annular return groove 46 in the porting plate. Since the return groove 46 is in constant communication with the inlet side of the two gear pumps through the passages 52 and 43, and the passages 54 and 56, Figure 2, the fluid circuit is completed.

During starting of the vehicle, a high torque ratio is required, and the swash plate 42 is adjusted to its maximum angular position with respect to a plane normal to the output shaft 17. The displacement of the variable displacement motor 34 is then at a maximum, resulting in a rotation of the cylinder barrel 36 of the motor and the output shaft 17 connected thereto at a minimum speed. As the speed of the vehicle increases, the angularity of the swash plate 42 is progressively decreased, decreasing the motor displacement and rotating the cylinder barrel and the output shaft at progressively higher speeds. Finally, with the angularity of the swash plate reduced to zero, i. e., normal to the output shaft 17, the displacement of the motor is reduced to zero and the entire pump assembly rotates as a unit and transmits power directly from the input shaft to the output shaft at a unitary ratio.

Figure 5:
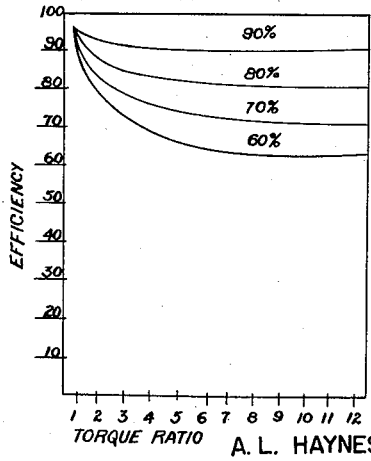
Figure 5 is a graph illustrating operating characteristics of the transmission.

The engine torque is divided between a mechanical path comprising the pump housing and the output shaft and a hydraulic path comprising the constant displacement pump and the variable displacement motor. Under conditions of low speed ratio and high torque ratio the majority of the power is transmitted through the hydraulic path, but as the speed ratio increases and the torque ratio decreases an increasingly larger portion of the power is transmitted mechanically until direct drive ratio is reached at which time the entire power output of the engine is transmitted mechanically. Inasmuch as the efficiency of the mechanical transmission of power through the mechanism is somewhat higher than the efficiency of the hydraulic transmission of power, the overall efficiency of the unit increases from a minimum at high torque ratios to a maximum at direct drive. The curves shown in the graph of Figure 5 illustrate the efficiency at various torque ratios for hydraulic units having efficiencies of 60%, 70%, 80% and 90% respectively. In each of the curves shown, at high torque ratio when the majority of the power is transmitted hydraulically, the efficiency is at a minimum. As the torque ratio decreases and a greater portion of the power is transmitted through the mechanical path, the efficiency increases until a maximum is reached at direct drive. Since a majority of normal driving is done in low torque ratios, it will be apparent that the efficiency of the unit is considerably higher than that of other type of transmissions such as hydrostatic transmissions.

It will be noted that the present invention solves the complex valving and porting problem in a relatively simple manner. No valves, except the bypass valve, are required, and the passages are easily formed in the pump housing and the porting plate, thus keeping the cost of manufacture of the unit at a minimum.

*Installation*

Reference is now made to Figures 6 to 12 inclusive, which illustrate various installations of the transmission of the present invention in a motor vehicle. The simplest installation is that shown in Figure 6, in which the conventionally mounted internal combustion engine 71 of the vehicle drives the pump 19 through the input shaft 14, the transmission being mounted immediately rearwardly of the engine. The output shaft 17 of the transmission is connected to the pinion 72 of a conventional differential 73, the latter being connected by axle shafts 74 to the rear wheels 75 of the vehicle.

The installation shown in Figure 7 differs from that in Figure 6 in that the transmission is mounted concentrically with one of the axis shafts 74, the input and output shafts of the transmission being hollow to permit the axle shafts to pass therethrough. Engine 71 drives a propeller shaft 76 which drives the pump 19 of the transmission through the bevel gears 77 and 78 and the hollow input shaft 79. The variable displacement motor 34 is connected by a hollow output shaft 81 with the differential 73, which drives the rear wheels 75 through the axle shafts 74. This installation is also well adapted for a vehicle of the rear engine type.

The construction shown in Figure 8 is similar to that shown in Figure 7 except that a pair of transmission units are provided, one encircling each of the axle shafts 74. The advantage of this construction is that the mechanical differential is eliminated since the two transmission units maintain a hydraulic differential between the two rear wheels 75.

The installation shown in Figures 9 and 10 is particularly adapted for a rear engine installation. The propeller shaft 76 from the engine 71 passes over the differential and the transmission unit and drives the pump 19 through spur gears 83 and 84. The output shaft 17 of the transmission unit drives the rear wheels 75 through a differential 85 of the hypoid type.

Figures 11 and 12 illustrate another modification, similar to that of Figures 9 and 10, but utilizing a hollow output shaft 87 through which the propeller shaft 76 passes to drive the pump 19. The output shaft 87 carries a bevel gear 88 which drives the differential 73, the latter being joined by axle shafts 74 to the rear wheels 75.

The foregoing are illustrative of certain installations of the present transmission in a motor vehicle, but it will be understood that other installations in motor vehicles and also in other mechanisms are contemplated. Similarly, although the transmission shown comprises a constant displacement pump and a variable displacement motor, other combinations can be substituted, such as a variable displacement pump and a constant displacement motor.

It will be understood that the invention is not to be limited to the exact construction shown and described, but that various changes and modifications may be made without departing from the spirit and scope of the invention, as defined in the appended claims.

What is claimed is:

1. In a hydraulic power transmission, a housing, an input shaft and an output shaft journaled in said housing, a hydraulic pump in said housing driven by said input shaft and having an element connected to said output shaft, pressure and return passages in said pump element, a hydraulic motor in said housing spaced axially from said pump and having an element connected to said output shaft to drive the latter, a fixed plate between said pump and said motor, a pair of annular grooves in one face of said plate communicating with said pressure and return passages respectively, and passages in said fixed plate interconnecting said annular grooves and said motor.

2. The structure defined by claim 1 which is further characterized in that said annular grooves are interconnected by a passage, and a bypass valve controlling said passage.

3. In a hydraulic power transmission, a housing, an input shaft and an output shaft journaled in said housing, a pump in said housing driven by said input shaft and having an element connected to said output shaft, said pump element having a radially disposed end face, pressure and return passages in said pump element extending to said end face, a hydraulic motor in said housing spaced axially from said pump and having an element connected to said output shaft to drive the latter, a fixed plate between said pump and said motor having a radially disposed end face adjacent said end face of said pump element, a pair of annular grooves formed in said end face of said fixed plate concentric with the axis of said output shaft and maintaining constant communication with said pressure and return passages respectively, and passages in said fixed plate interconnecting said annular grooves and said motor.

4. In a hydraulic power transmission, a housing, an input shaft and an output shaft journaled in said housing, a pump housing connected to said output shaft and rotatable therewith, a gear carried by said input shaft and rotatable within said pump housing, a pair of additional gears journaled within said pump housing on opposite sides of said first-mentioned gear, each of said pair of gears meshing with said first-mentioned gear to form a fluid pump therewith, a pressure passage and a return passage in said pump housing for each of the gear pumps thus formed, a variable displacement motor in said housing spaced axially from said pump housing and having an element connected to said output shaft to drive the latter, a fixed member between said pump housing and said motor, a pair of annular grooves in said fixed member in constant communication with the pressure passages and the return passages respectively in said pump housing, and additional passages in said fixed member interconnecting said annular grooves and said variable displacement motor.

ALEX L. HAYNES.
VICTOR G. RAVIOLO.

REFERENCES CITED

The following references are of record in the file of this patent:

UNITED STATES PATENTS

| Number | Name | Date |
|---|---|---|
| 1,243,640 | Story | Oct. 16, 1917 |
| 1,773,587 | Lape | Aug. 19, 1930 |
| 1,840,866 | Rayburn et al. | Jan. 12, 1932 |
| 1,840,869 | Rayburn | Jan. 12, 1932 |
| 2,114,076 | Gölz | Apr. 12, 1938 |
| 2,353,730 | Joy | July 18, 1944 |